Figure 1:
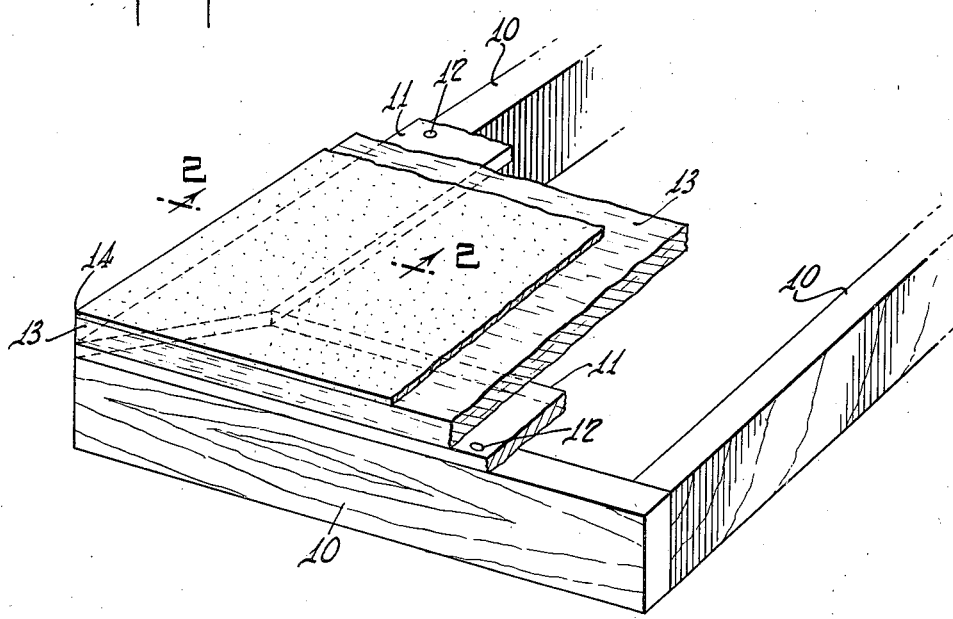

March 17, 1942.     W. W. COLPITTS     2,276,763
CONSTRUCTION UNIT
Filed Oct. 15, 1938

INVENTOR
WALTER W. COLPITTS
BY
ATTORNEY

Patented Mar. 17, 1942

2,276,763

UNITED STATES PATENT OFFICE 2,276,763

CONSTRUCTION UNIT

Walter W. Colpitts, Princeton, N. J., assignor to The Celotex Corporation, Chicago, Ill., a corporation of Delaware Application October 15, 1938, Serial No. 235,146

1 Claim. (Cl. 20—4)

This invention relates to a structural unit facilitating the application in constructions using board form materials such as are generally referred to as fiber insulating board. The structural unit comprising the invention hereof provides an improved method of securing fiber insulating boards, or materials of the general characteristics thereof, to a suitable frame-work or the like to constitute a structural unit the use of which is very advantageous in many structural applications.

Fiber insulating boards or like materials can, of course, be applied in construction by nailing or the like but when securing means in the nature of nails are used there is always the disadvantage that the nail heads, or if fasteners are used, that some portion thereof is ordinarily exposed to view after the fiber insulating board is secured in place.

Attempts have been made to apply fiber insulating boards in construction by gluing them in place to studs and the like but heretofore such attempts to apply fiber insulating boards by adherence have not resulted at all satisfactorily, since as the individual fibers of the fiber insulating boards are not very firmly bound into the sheet, it often results that a fiber insulating board applied with an adhesive will under relatively light stress pull away from the members to which it has been adhered leaving merely a very thin layer of the surface fibers of the fiber insulating board on the surface of the adhesive which was used in originally applying the sheet.

According to the invention hereof it becomes possible to satisfactorily apply sheets of fiber insulating board by the use of adhesives since by the construction involved there is provided a relatively large gluing area so that what might be termed the total adhesion of the applied sheet has been increased to a point whereby fiber insulating boards or like material may be satisfactorily applied in construction by the use of adhesives.

It is an object of this invention to provide a structural unit which makes practical the application of fiber insulating boards or like materials in construction work, adhered in place with adhesives, so that on the one hand there are no exposed nail heads or exposed portions of other mechanical fastening means to be unsightly or on the other hand it is not necessary to provide some means such as strips of moulding or the like for covering the exposed portions of fastening means.

Still other and further objects of the invention hereof are the provision of a complete structural unit incorporating fiber insulating board, the provision of a method of construction making practical the applicating of fiber insulating boards by the use of adhesives and to accomplish other and further objects of the invention which will be apparent upon consideration of the following specification.

Figure 2:
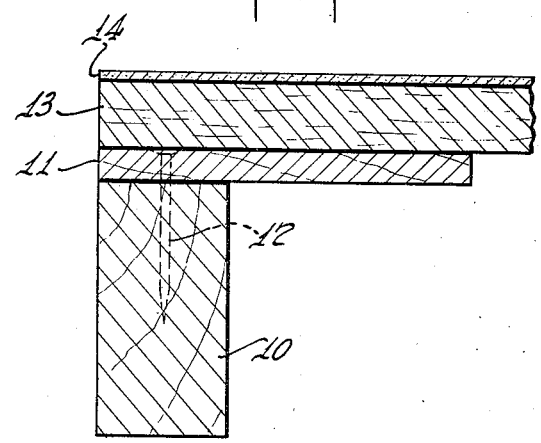

In the drawing:

Figure 1 is a perspective view of a portion of a structural unit incorporating the inventions hereof; and, Figure 2 is a cross section taken on line 2—2, Figure 1.

In the accompanying drawing, similar reference numerals will be used to indicate like portions in the various views.

The structural unit hereof comprises a frame-like portion to which is applied and suitably secured fiber insulating board or like sheet-material which structural uint may as a unit be utilized in the erection of walls to be applied as an exterior or as an interior finish, or both, according to the particular construction of the structural unit, that is, the sheet form material utilized if suitable for exteriors, may constitute the exterior surfacing of a structural unit and an exterior finishing product; whereas, if the applied sheet material is an interior finishing material then the structural unit is constituted a unit for interior use. If the unit is constructed incorporating both exterior and interior finishing materials, the unit may serve as both exterior and interior finish.

A structural unit in accordance with the invention hereof comprises a wooden or other suitable framework which is illustrated in the drawing as constituting a rectangular frame indicated at 10. It is of course to be understood that the utilization of this invention is not limited to the provision of rectangular structural units but that if desired the framework may be circular or triangular or substantially any other desired shape but that in any case the results are independent of the particular shape of the framework comprising what might be termed the base member of the unit.

The framework portion of the structural unit hereof may conveniently be constructed of 2" by 4" lumber and of any convenient or desired dimensions and with or without intermediate cross members according to the requirements, which of course will depend to a considerable extent upon the size of the framework and the physical characteristics of the facing sheets which are to be mounted thereon.

The framework as illustrated in the drawing may be considered as being constructed of 2" by 4" lumber and of dimensions of approximately 2 feet in width by 8 feet in length. The several individual members making up the framework will of course be suitably secured at their various junctures and while no means therefore are specifically illustrated it will so far as the illustration hereof is concerned be considered that the individual members 10 at their various junctures are suitably glued. In addition to the gluing of the members 10 at their juncture, they may be additionally secured by nails, dowels, screws, by dove-tails or by any other appropriate securing means.

On one face of the framework composed of members 10 there is secured a strip of material which may be fiber insulating board, wood, plywood or other sheet form material, the such strips applied to one face of the framework being indicated at 11. The strips 11 which are applied to the framework, are in the illustration hereof assumed to be of a width of about six inches and of a thickness of say about ½ inch. These strips 11 are applied all around the framework on one face of the various members 10 and may be secured to such members by any suitable means, as for example: by nails 12 or by screws or by gluing or by a combination of nails or screws and gluing or by any other suitable securing means, the primary essential being that the strips 11 shall be firmly secured to the members 10. In connection with securing the strips 11 to the members 10 it is unnecessary to consider whether the securing means might be exposed since, in the further construction of the structural unit hereof, the strips 11 are entirely covered and therefore the appearance is immaterial.

After the framework comprising the members 10 has been prepared and the strips 11 have been secured thereon as has been described, the next step in the construction of the structural unit hereof is to apply thereto the sheet form material which is to be the facing of the structural unit. In the particular illustration of the drawing, the facing sheet which is applied to the structural unit is a composite sheet of fiber insulating board and asbestos-cement sheet, the insulation board portion thereof being indicated at 13 and the asbestos-cement sheet portion thereof indicated at 14. The particular facing sheet composed of the several portions indicated at 13 and 14 may be a pre-fabricated product in which the such product is fabricated from a sheet of fiber insulating board and a sheet of asbestos-cement material adhered in face to face relation by suitable adhesive.

The composite sheet 13—14 has applied on its back face all around its edges a suitable adhesive and similarly suitable adhesive is applied to the face of the strips 11 which were previously secured to members 10 and then the composite sheet is placed on the previously prepared framework and due to the adhesive applied as mentioned, the composite sheet is caused to adhere to the strips 11. It will of course be understood that the particular adhesive or the specific steps of adhering the composite sheet 13—14 to the strips 11 are not of the essence hereof and that any satisfactory or desired method of gluing or adhering may be employed in so applying the composite sheet to the previously prepared framework, and that there will be utilized such steps of pressing and the like which may be required to obtain satisfactory adhesion.

It will be seen that in a completed unit prepared as above described, that the facing sheet, that is the composite sheet 13—14 is secured to the framework in such manner that the securing means is not visible from the face of the completed unit and further, that due to the interposition of the strips 11 between the members 10 and the composite facing material that there is afforded a wide gluing surface for adhering the composite facing so that the area over which the composite facing is secured is large, as compared with the area over which it would be secured were it merely adhered to the faces of the framework members 10 and that therefore the composite facing may be much more securely mounted on the framework by the interposition of the strips 11.

It is readily apparent that the framework of the structural unit will for many purposes be of sufficient strength to be load-bearing and that the application of the composite sheet to the framework as described strengthens and increases the such characteristics of the framework since the framework and the facing sheet strengthen and assist each other in providing in the combination a complete structural unit.

On the other face of the framework composed of the members 10 a further facing sheet may be secured in the same manner as has been above described in connection with the application of the composite sheet 13—14 thereto and it will be understood that insofar as is here concerned, the facing sheets whether secured to one side of the framework or the other side thereof may be any suitable sheet form material. The specific construction hereof is particularly advantageous in building up units embodying as the facings materials usually referred to as fiber insulating boards which as previously explained cannot be satisfactorily glued unless there is afforded for such gluing a considerable gluing area so that the total adhered area is rather large whereby upon the application of stresses to the completed unit the unit stress over the adhered area is relatively low.

It will be seen that by the above described construction, there is provided structural units which are particularly advantageous in connection with the utilization of fiber insulating board and materials of such general character and that by following the construction as described, the said structural units may be built without having visible on the surfaces thereof any securing means as for example: the heads of nails or of screws or the like.

The invention hereof having been fully described, I claim:

A building construction unit adapted for erection together with other similar units to provide a wall construction, the construction unit comprising a closed perimetric supporting frame composed of a plurality of structural supporting strips connected at the ends one to another providing a shallow open faced box like structure, securing strips of a width greater than the structural supporting strips secured to an edge face of the perimetric supporting frame and secured thereto by mechanical fastenings, the securing strips wider than the face of the supporting frame to which secured, the outer edges of the securing strips substantially flush with the outer faces of the structural supporting strips and extending inwardly beyond the inner faces thereof and a facing sheet peripherally mounted on and adhesively secured to the exposed face of the securing strips, the building construction unit resulting having no mechanical fastenings extending through the facing sheet to secure the facing sheet to the supporting frame.

WALTER W. COLPITTS.